(12) United States Patent
Reithmeier et al.

(10) Patent No.: US 10,286,869 B2
(45) Date of Patent: May 14, 2019

(54) SYSTEM AND METHOD FOR ASSEMBLING A TRIM COVER ASSEMBLY

(71) Applicant: Lear Corporation, Southfield, MI (US)

(72) Inventors: Florian Reithmeier, Oberding Schwaig (DE); Michael Tracht, Altheim (DE); Christopher Stahl, Oberding-Schwaig (DE)

(73) Assignee: Lear Corporation, Southfield, MI (US)

( * ) Notice: Subject to any disclaimer, the term of this patent is extended or adjusted under 35 U.S.C. 154(b) by 387 days.

(21) Appl. No.: 15/298,047

(22) Filed: Oct. 19, 2016

(65) Prior Publication Data

US 2017/0182965 A1 Jun. 29, 2017

(30) Foreign Application Priority Data

Dec. 28, 2015 (DE) .................. 10 2015 226 747

(51) Int. Cl.
| | |
|---|---|
| *B60N 2/60* | (2006.01) |
| *B60R 21/2165* | (2011.01) |
| *B60N 2/58* | (2006.01) |
| *D05B 9/00* | (2006.01) |
| *D05B 23/00* | (2006.01) |
| *B60R 21/207* | (2006.01) |

(52) U.S. Cl.
CPC ............ *B60R 21/2165* (2013.01); *B60N 2/58* (2013.01); *B60N 2/5891* (2013.01); *B60N 2/609* (2013.01); *D05B 9/00* (2013.01); *D05B 23/00* (2013.01); *B60N 2002/5808* (2013.01); *B60R 21/207* (2013.01)

(58) Field of Classification Search
CPC ...... B60N 2/609; B60N 2/58; B60R 21/2165; B60R 21/2342

USPC .............................................. 112/142, 475.17
See application file for complete search history.

(56) References Cited

U.S. PATENT DOCUMENTS

| | | | |
|---|---|---|---|
| 8,113,539 B2 | 2/2012 | Paruszkiewicz et al. | |
| 8,171,868 B2 | 5/2012 | Evans et al. | |
| 8,176,863 B2 | 5/2012 | Evans et al. | |
| 8,347,438 B2 | 1/2013 | Bell | |
| 8,511,243 B2 | 8/2013 | Gonzalez et al. | |
| 8,876,154 B2 | 11/2014 | Tracht et al. | |
| 2012/0038131 A1* | 2/2012 | Muller | B60R 21/201 |
| | | | 280/728.2 |
| 2016/0355153 A1* | 12/2016 | Barnes | B60R 21/201 |

FOREIGN PATENT DOCUMENTS

| | | |
|---|---|---|
| AT | 001 782 U1 | 11/1997 |
| DE | 2518477 A1 | 11/1976 |
| DE | 29704593 U1 | 5/1997 |
| DE | 19850742 A1 | 5/2000 |
| DE | 202004020928 U1 | 5/2006 |
| DE | 102009053963 A1 | 5/2011 |

OTHER PUBLICATIONS

German Patent and Trademark Office, German Office Action for the corresponding German Patent Application No. 10 2015 226 747.4 dated Jan. 3, 2017.

* cited by examiner

*Primary Examiner* — Tajash D Patel
(74) *Attorney, Agent, or Firm* — Brooks Kushman P.C.

(57) ABSTRACT

A system and method for assembling a trim cover. A seam may be provided to attach the first trim panel to a second trim panel. Tabs and notches may be provided with at least one of the trim panels. One or more stitch attributes may be measured in response to detection of a tab or notch.

20 Claims, 4 Drawing Sheets

SYSTEM AND METHOD FOR ASSEMBLING A TRIM COVER ASSEMBLY

TECHNICAL FIELD

This disclosure relates to a system and method for assembling a trim cover assembly, such as may be provided with a vehicle seat.

BACKGROUND

A sewing method for a seat cover is disclosed in U.S. Pat. No. 8,176,863.

SUMMARY

In at least one embodiment, a method of assembling a trim cover assembly is provided. The method may include aligning a first trim panel with a second trim panel. At least one of the trim panels may have a plurality of tabs, such as first, second, and third tabs, that may be spaced apart from each other. The first region may be disposed at least partially between the first tab and the second tab. A second region may be disposed at least partially between the second tab and the third tab. The first and second trim panels may be fed into a sewing machine to stitch a seam that attaches the first trim panel to the second trim panel. A stitch attribute associated with the first region of the seam may be measured when the first tab is detected by a detection device. Measurement of the stitch attribute associated with the first region may end when the second tab is detected. Measurement of a stitch attribute associated with the second region may begin when the second tab is detected and may end when the third tab is detected. The method may then determine whether the stitch attributes associated with the first region and the second region are within tolerance.

In at least one embodiment, a method of assembling a trim cover assembly is provided. The method may include aligning a first trim panel with a second trim panel. At least one of the trim panels may have a plurality of notches, such as first, second, and third notches, that may be spaced apart from each other. The first region may be disposed at least partially between the first notch and the second notch. A second region may be disposed at least partially between the second notch and the third notch. The first and second trim panels may be fed into a sewing machine to stitch a seam that attaches the first trim panel to the second trim panel. A stitch attribute associated with the first region of the seam may be measured when the first notch is detected by a detection device. Measurement of the stitch attribute associated with the first region may end when the second notch is detected. Measurement of a stitch attribute associated with the second region may begin when the second notch is detected and may end when the third notch is detected. The method may then determine whether the stitch attributes associated with the first region and the second region are within tolerance.

In at least one embodiment, a system for assembling a trim cover assembly is provided. The system may include a sewing machine that may have a needle, a detection device, and an electronic controller. The needle may stitch a thread into the first and second trim panels to form a seam that attaches the first trim panel to the second trim panel. The detection device may detect tabs that may extend from at least one of the first and second trim panels. The electronic controller may control operation of the sewing machine. A first region of the seam may be disposed between the first tab and the second tab. A second region of the seam may be disposed between the second tab and the third tab. The electronic controller may determine a stitch attribute of the first region based on detection of the first and second tabs. The electronic controller may determine the stitch attribute of the second region based on detection of the second and third tabs.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
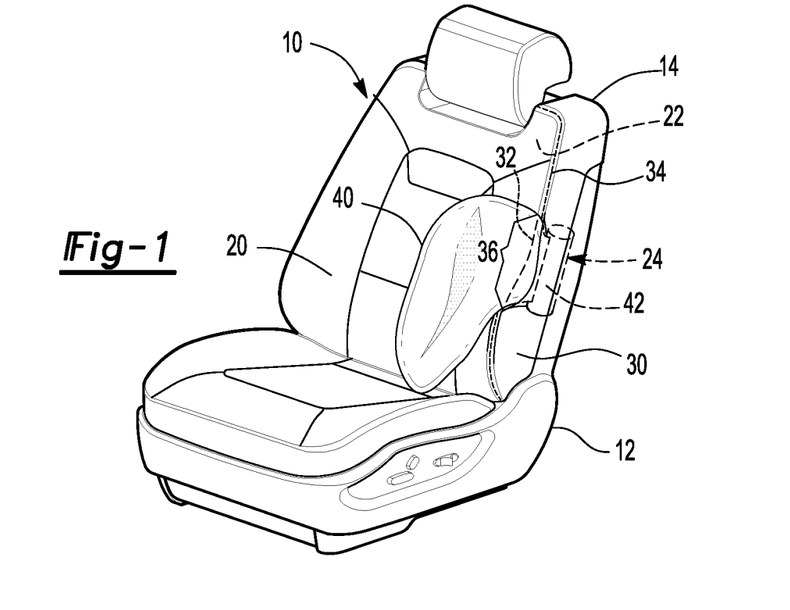
FIG. 1 is a perspective view of an exemplary seat assembly having a trim cover assembly.

Referring to FIG. 1, an exemplary seat assembly 10 is shown. The seat assembly 10 may be provided with a motor vehicle, such as a car or truck. The seat assembly 10 may include a seat bottom 12 and a seat back 14. The seat back 14 may include trim cover assembly 20, a cushion 22, and an airbag module 24.

The trim cover assembly 20 may form an exterior surface of at least a portion of the seat back 14. The trim cover assembly 20 may be made of any suitable material, such as fabric, vinyl, leather, or combinations thereof. The trim cover assembly 20 may engage and may at least partially cover or conceal the cushion 22.

Figure 2:
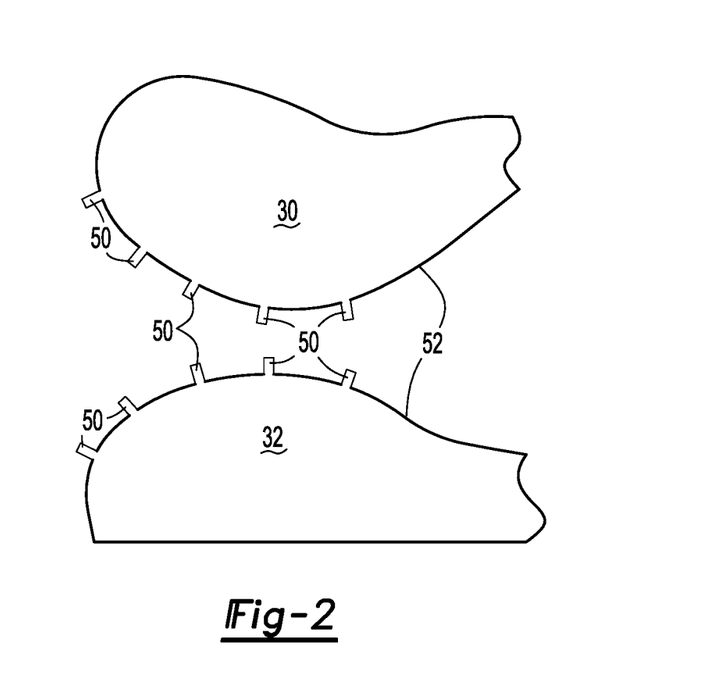
FIG. 2 shows examples of trim panels that may be provided with the trim cover assembly.

Referring to FIGS. 1 and 2, the trim cover assembly 20 may include a plurality of trim panels that may be attached to each other with stitched seams. A seam may include at least one thread that may be stitched through at least two trim panels. By way of example, the trim cover assembly 20 may include a first trim panel 30 and a second trim panel 32 that may be attached to each other with a seam 34 that may extend through the first trim panel 30 and the second trim panel 32. The seam 34 may include an airbag deployment seam portion 36 that may sever to permit deployment of an airbag of the airbag module 24 as will be discussed in more detail below. For instance, the first trim panel 30 and the second trim panel 32 may be disposed proximate and may extend over a side bolster that may protrude forward and may be disposed along a lateral side of the seat back 14.

The cushion 22 may be disposed under the trim cover assembly 20. The cushion 22 may be made of any suitable material, such as foam or a molded polymeric material.

The airbag module 24 may be mounted within the seat back 14 and may be configured to deploy an airbag to help protect a seat occupant. For instance, the airbag module 24 may be a side airbag module that may deploy an airbag along a side of the seat assembly 10 between a vehicle door and a seat occupant. The airbag module 24 may include an airbag 40 that may receive an inflation gas from an inflator 42 to inflate the airbag 40 from a stored condition to an inflated condition. In the stored condition, the airbag 40 may be deflated and may be folded or stored inside the seat back 14. As such, the airbag 40 may be covered or concealed by the trim cover assembly 20 and may not be visible from outside the seat assembly 10. In the deployed condition, the airbag 40 may expand and exit the seat back 14. More specifically, the airbag 40 may exit the seat back 14 by severing the airbag deployment seam portion 36 of the seam 34.

Figure 3:
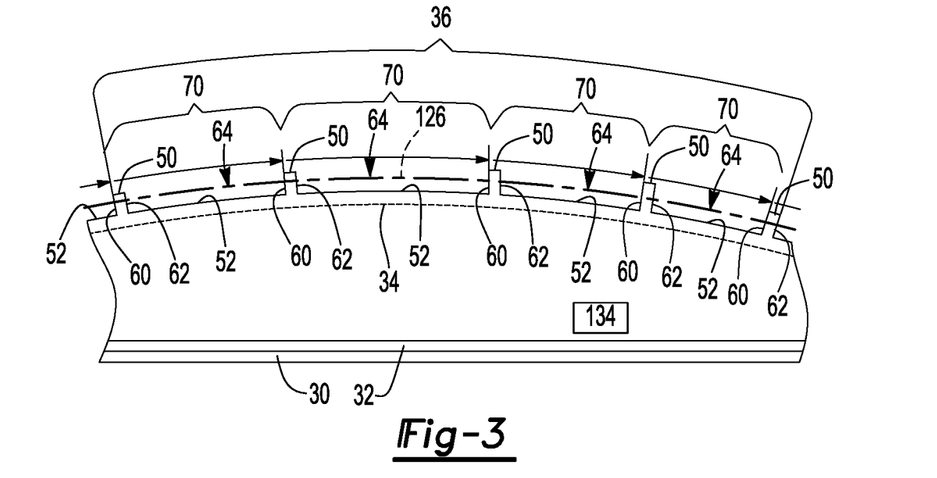
FIGS. 3 and 4 are magnified views of a portion of the trim cover assembly having trim panels stitched together with a seam.

Referring to FIG. 2, exemplary first and second trim panels 30, 32 are shown in more detail. The first trim panel 30, the second trim panel 32, or both the first trim panel 30 and the second trim panel 32 may include a set of tabs 50. The tabs 50 may extend away from the seam 34 and may extend outwardly from a perimeter edge 52 of the trim panel. As is best shown in FIG. 3, the perimeter edge 52 may be spaced apart from the seam 34 and may extend substantially parallel to the seam 34 in one or more embodiments. In FIGS. 2 and 3, five tabs 50 are shown on a trim panel; however, it is contemplated that a greater or lesser number of tabs 50 may be provided. At least three tabs 50 may be provided to provide a plurality of regions. For convenience in reference, the tabs 50 in FIG. 3 are designated numerically from left to right. For instance, the leftmost tab 50 may be referred to as a first tab, the tab 50 located immediately to the right of the first tab may be designated a second tab, tab 50 located immediately to the right of the second tab may be designated a third tab and so on. All or some of the tabs 50 may be spaced apart from each other by different distances.

The tabs 50 may have any suitable configuration. For example, the tabs 50 may each have a generally rectangular configuration in one or more embodiments. Each tab 50 may include a leading edge 60 and a trailing edge 62. The leading edge 60 and the trailing edge 62 may extend from a portion of the perimeter edge 52 of a trim panel 30, 32. The leading edge 60 may be the side or edge that is first fed into a sewing machine. The trailing edge 62 may be disposed opposite the leading edge 60 and may be fed into a sewing machine after the leading edge 60. In FIG. 3, the leading edge is disposed on the left side of each tab 50 while the trailing edge 62 is disposed on the right side of each tab 50. The leading edge 60 and the trailing edge 62 may be disposed substantially parallel to each other in one or more embodiments.

The tabs 50 may be located along a portion of the perimeter edge 52 that may extend along a curve or an arc (e.g., a curved perimeter edge) or that may extend around the corner. The tabs 50 may be disposed along a curved perimeter edge or corner to help monitor and control how the seam 34 is provided at the seam or corner as the trim panels may be stretched or bound up (e.g., folded over each other) during sewing or when the seam 34 is provided along a curve or an arc, which may result in too many or too few stitches being provided in a particular area or region.

The tabs 50 may be spaced apart from each other such that a notch 64 may be disposed between adjacent tabs 50. A notch 64 may be at least partially defined by the perimeter edge 52 and an edge of an adjacent tab 50 such as a trailing edge 62 of one tab 50 and a leading edge 60 of another tab 50. The notches 64 may be spaced apart from each other such that a tab 50 may be disposed between adjacent notches 64.

The tabs 50 and/or notches 64 may be spaced apart from each other and may define a plurality of regions 70. Each region 70 may be at least partially disposed between two tabs 50 or two notches 64 that may be positioned in series. In FIG. 3, four regions are shown; however, it is contemplated that a greater or lesser number of regions may be provided. Each region 70 may extend from one tab 50 to the next tab 50 in series. Moreover, a region 70 may be defined with respect to an edge of a tab 50. For instance, a region 70 may extend from a leading edge 60 of a tab 50 to the leading edge 60 of the next tab 50. Alternatively, a region 70 may extend from a trailing edge 62 of the tab 50 to the trailing edge 62 of the next tab 50. For convenience in reference, the regions 70 in FIGS. 3 and 4 may be designated numerically from left to right. For instance, in FIG. 3, a first region 70 may extend from the leading edge 60 of the first tab 50 to the leading edge 60 of the second tab 50, a second region 70 may extend from the leading edge of the second tab 50 to the leading edge 60 of the third tab 50, and so on.

Figure 4:
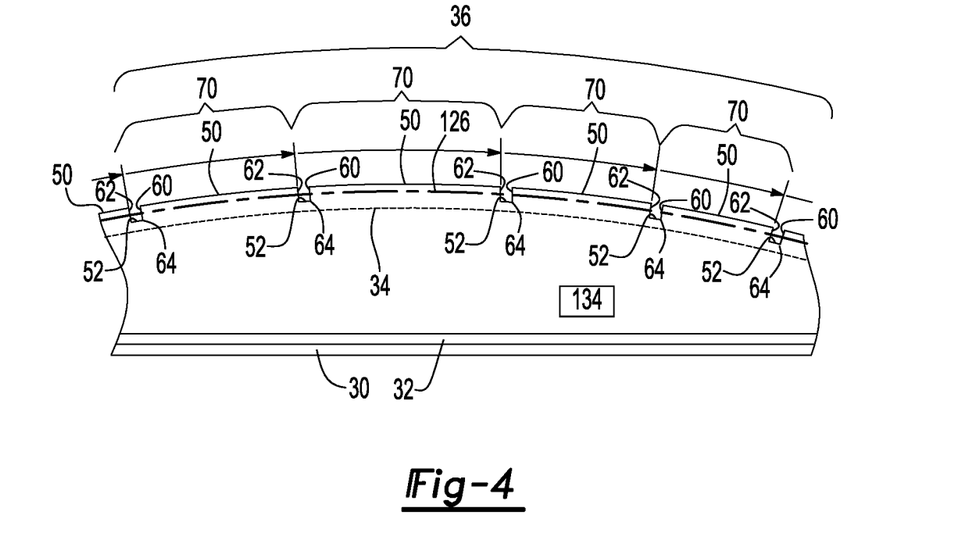

In FIG. 4, a configuration similar to FIG. 3 is shown in which the tabs 50 have a greater length or extend a greater distance in a direction in which the seam 34 extends than the notches 64. FIG. 4 also shows that each region 70 may extend from one notch 64 to the next notch 64 in series. In FIG. 4, a first region 70 may extend from the trailing edge 62 of the first tab 50 to the trailing edge 62 of the second tab 50, a second region 70 may extend from the trailing edge 62 of the second tab 50 to the trailing edge 62 of the third tab 50, and so on.

Figure 5:
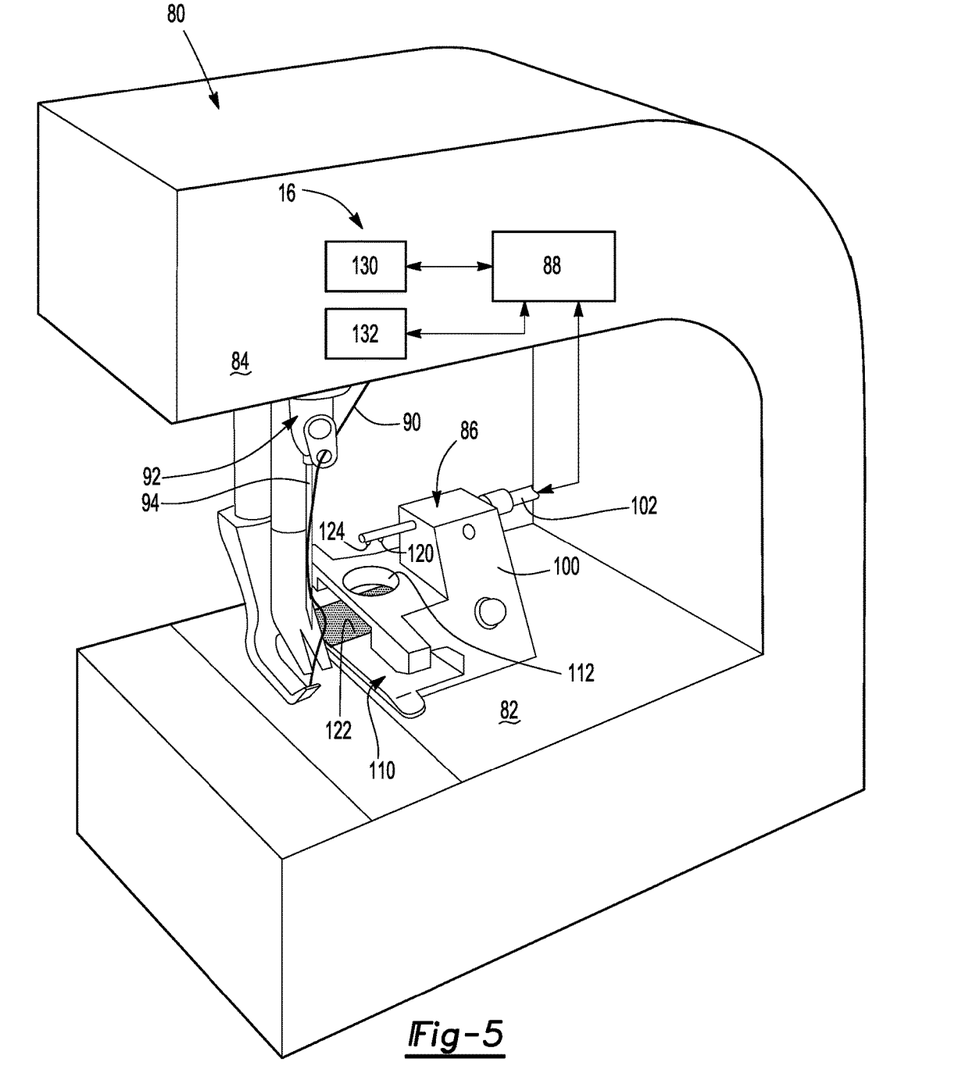
FIG. 5 is a perspective view of a portion of a sewing machine.

Referring to FIG. 5, an exemplary sewing machine 80 is shown. The sewing machine 80 may be configured to sew or stitch the trim panels 30, 32 together. The sewing machine 80 may include a bed 82, an upper portion 84, a detection device 86, and a controller 88.

The bed 82 may be configured to support the trim panels and may be stationary in one or more embodiments. The bed 82 may include an opening that may facilitate stitching of the trim panels. For example, the opening may receive a looper mechanism or a shuttle hook and bobbin assembly that may engage a thread 90 during stitching operations in a manner known by those skilled in the art.

The upper portion 84 may extend from the bed 82. A needle bar assembly 92 and a presser foot may be disposed proximate an end of the upper portion 84. The needle bar assembly 92 may include a needle 94 for penetrating the trim panels to be sewn. The needle may facilitate stitching of the thread 90 to form the seam 34. The upper portion 84 may receive a needle bar driver assembly that may actuate the needle bar assembly 92 in an oscillating motion. The presser foot may exert downward pressure on the trim panels as the trim panels are fed under the needle 94.

The detection device 86 may be disposed on the bed 82 and may be configured to detect the tabs 50 and/or the notches 64. The detection device 86 may be offset laterally from the needle bar assembly 92 so as not to interfere with stitching the trim panels together. The detection device 86 may include a guide block 100 and a sensor subassembly 102.

The guide block 100 may be disposed on the bed 82 and may include a slot 110 and an opening 112. The slot 110 may extend generally parallel to the direction in which the trim panels 30, 32 are fed through the sewing machine 80. The slot 110 may be open in a direction that may face toward the needle bar assembly 92. The trim panels may be fed through the slot 110 during sewing. The opening 112 may be disposed above the slot 110.

The sensor subassembly 102 may be disposed on the guide block 100. The sensor subassembly 102 may be configured to detect the presence or absence of the tabs 50 and hence the position of the trim panels that are being stitched. The sensor subassembly 102 may be of any suitable type, such as an optical sensor (e.g., fiber optic, laser), proximity sensor, or vision system. In at least one embodiment, the sensor subassembly 102 may be an optical sensor that may include an emitter 120, a mirror 122, and a detector 124. The emitter 120 may be disposed proximate the guide block 100 and may provide an optical signal, such as a laser beam that may be directed through the opening 112 toward the mirror 122. The laser beam may be reflected by the mirror 122 to the detector 124 when the laser beam is not obstructed by a tab 50. The detector 124 may be disposed near the emitter 120 in one or more embodiments. Hence, the detector 124 may detect the presence or absence of a tab 50 as the trim panels 30, 32 are fed through the slot 110 in the guide block 100. An optical signal, such as a laser beam may follow a path 126 such as is shown in FIG. 3. Such a path 126 may be disposed substantially parallel to the seam 34 and may be spaced apart from the perimeter edge 52 of one or more trim panels 30, 32 such that the path 126 may intersect the tabs 50, but not the perimeter edge 52, as the trim panels are fed through the slot 110 in the guide block 100.

The controller 88 may be of any suitable type, such as an electronic controller like a microprocessor-based controller or programmable logic controller. One or more controllers 88 may be provided to monitor and control operation of the sewing machine 80. For example, the controller 88 may control operation of the needle bar assembly 92 and may control the sensor subassembly 102 as represented by the arrowed line that extends from the controller 88 to the sensor subassembly 102.

The controller 88 may be electrically connected to or may be in communication with other sensors or input devices and may process input signals or data from various other devices or sensors, such as an operator communication device 130 and a printer 132.

The operator communication device 130 may be provided to communicate with an operator. The operator communication device 130 may be of any suitable type or types, such as a switch, button, sensor, display, touchscreen, voice command or speech recognition system, or the like. The operator communication device 130 may be used to input data. For instance, the operator communication device 130 may be used to input or designate a model of the trim cover assembly that is to be sewn. Such an input may be used to access data stored in memory that may be associated with the trim cover assembly model, such as the number of tabs, number of regions, and the stitch length or number of stitches that are to be provided in each region. Such stored data may also be entered with the operation communication device 130.

Figure 6:
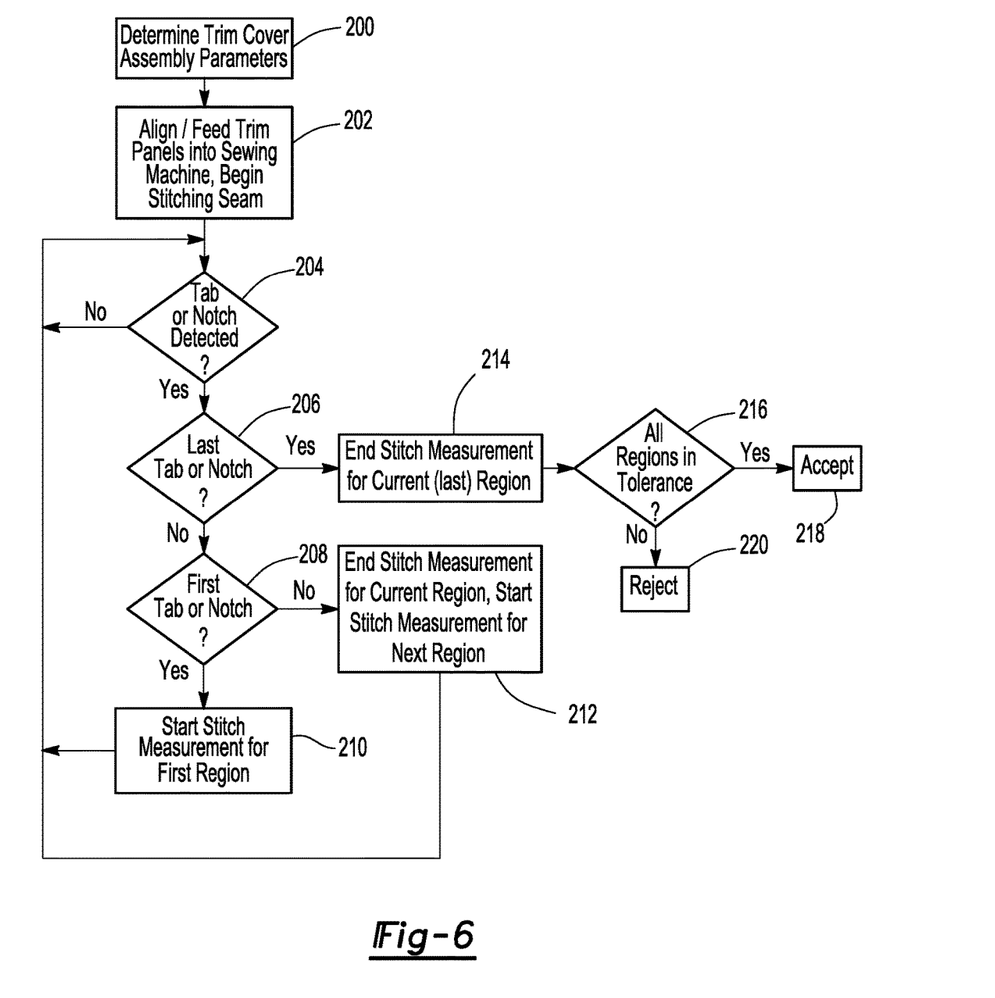
FIG. 6 is a flowchart of a method of assembling a trim cover assembly.

Referring to FIG. 6, a flowchart depicting a method of assembling a trim cover assembly is shown. The method may control operation of the sewing machine 80 and may facilitate a determination of whether the trim cover assembly 20 has been properly stitched and assembled. The method will primarily be described with reference to FIG. 3.

As will be appreciated by one of ordinary skill in the art, the flowcharts may represent control logic that may be implemented or affected in hardware, software, or a combination of hardware and software. For example, the various functions may be effected by a programmed microprocessor. The control logic may be implemented using any of a number of known programming and processing techniques or strategies and is not limited to the order or sequence illustrated. For instance, interrupt or event-driven processing is typically employed in real-time control applications rather than a purely sequential strategy as illustrated. Likewise, parallel processing, multitasking, or multi-threaded systems and methods may be used to accomplish the objectives, features, and advantages of the present invention. The implementation of the method is independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the features and advantages of the present invention. The illustrated functions may be modified, or in some cases omitted, without departing from the spirit or scope of the present invention.

At block 200, parameters of the trim cover assembly may be determined. Parameters of the trim cover assembly 20, such as the number of tabs 50, number of notches 64, number of regions 70, stitch length in each region 70, and/or number of stitches in each region 70 may be based on the trim cover assembly model that is to be sewn. Such parameters may be preprogrammed or may be stored in memory that may be accessed by the controller 88. The trim cover assembly model may be provided by the operator communication device 130 as previously discussed.

At block 202, the trim panels that are to be sewn may be aligned and fed into the sewing machine 80. The trim panels may be aligned by placing the first trim panel 30 on top of the second trim panel 32 (or vice versa) such that the first trim panel 30 and the second trim panel 32 are in a desired overlapping position with respect to each other. The trim panels may be positioned and aligned manually. Once the trim panels are aligned, the trim panels may be fed into the sewing machine 80. The trim panels may be fed manually or with the assistance of the sewing machine 80 in a manner known by those skilled in the art. The sewing machine 80 may begin providing the stitched seam 34 after feeding of the trim panels has commenced.

At block 204, the method may determine whether a tab or a notch is detected. A tab 50 or a notch 64 may be detected by the detection device 86 as previously discussed. For example, a tab 50 may be detected when the laser beam is blocked by a tab 50, thereby inhibiting the laser beam from being detected by the detector 124. Similarly, a notch 64 may be detected when the laser beam is not blocked by a tab 50, thereby allowing the laser beam from being detected by the detector 124. In a tab-counting configuration, if a tab 50 is not detected, then the sewing machine 80 may continue to stitch the seam 34 and the method may continue in a loop at block 204. If a tab 50 is detected, then the method may increment a tab counter that may count the total number of tabs that have been detected and may continue at block 206. In a notch-counting configuration, if a notch 64 is not detected, then the sewing machine 80 may continue to stitch the seam 34 and the method may continue in a loop at block 204. If a notch 64 is detected, then the method may increment a notch counter that may count the total number of notches that have been detected and may continue at block 206.

At block 206, the method may determine whether the last tab or the last notch has been detected. The last tab may be detected by comparing the value of the tab counter to a total number of tabs that are associated with the selected trim cover assembly model. The total number of tabs may be manually entered or may be a predetermined value that may be stored in memory as previously discussed. For example, if the total number of tabs is five, then the last tab may be detected when the tab counter equals five. The last notch may be detected by comparing the value of the notch counter to a total number of notches that are associated with the selected trim cover assembly model. The total number of notches may be manually entered or may be a predetermined value that may be stored in memory as previously discussed. If the last tab or last notch has not been detected, then the method may continue at block 208. If the last tab or last notch has been detected, then the method may continue at block 214.

At block 208, the method may determine whether the first tab or first notch has been detected, or whether the detected tab 50 is the first tab in the series of tabs, or whether the detected notch 64 is the first notch in the series of notches. For instance, the first tab may be detected when the tab counter is incremented from 0 to 1. Similarly, the first notch may be detected when the notch counter is incremented from 0 to 1. If the detected tab is the first tab or the detected notch is the first notch, then the method may continue at block 210. If the detected tab is not the first tab or the detected notch is not the first notch, then the method may continue at block 212.

At block 210, stitch measurement for the first region may be started or initiated. The first region 70 may be disposed between the first tab 50 and the second tab 50 or may be disposed between the first notch 64 and the second notch 64 as previously discussed. Stitch measurement may include measuring one or more attributes of the stitch or stitch seam 34 that is provided in the first region 70. Such attributes may include counting the number of stitches that are provided in the first region 70, measuring the stitch length or length of the stitch that is provided in the first region 70, or both. Such counted values or measurements may be stored in memory for subsequent use. The method may then continue at block 204.

At block 212, the method may end stitch measurement for the current region and may start stitch measurement for the next region. More specifically, block 212 may be executed when the tab 50 that has been most recently detected is not the first tab and not the last tab. For example, if the tab 50 that has been most recently detected is the second tab, then the method may end stitch measurement for the first region 70 and may start stitch measurement for the second region 70. Similarly, in a notch-counting configuration, if the notch 64 that has been most recently detected is the second notch, then the method may end stitch measurement for the first region 70 and may start stitch measurement for the second region 70. Stitch measurement may include counting or measuring one or more attributes as previously discussed. The method may then continue at block 204.

At block 214, the method may end stitch measurement for the last region. More specifically, block 214 may be executed when the tab 50 that has been most recently detected is the last tab or when the notch 64 that is most recently detected is the last notch. As such, the method may end stitch measurement for the last region 70 and not initiate stitch measurement for an additional or subsequent region. The sewing machine 80 may continue to stitch the seam 34 and may then continue at block 216.

At block 216, the method may determine whether all of the regions are within tolerance. A region 70 may be within tolerance when one or more associated stitch attributes are within an associated predetermined tolerance. For instance, if the measured stitch attribute is the number of stitches in the region 70, then the method may compare the number of stitches that were provided in the region to an expected number of stitches. The expected number of stitches may be expressed as a single value or a range. As a more specific example, if the expected number stitches in the first region 70 is expressed as a single value, then the seam 34 in the first region 70 may be acceptable when the actual number of stitches (e.g., counted number of stitches in the first region 70) is equal to the expected number of stitches provided. If the expected number of stitches is expressed as a range, then the seam 34 in the first region 70 may be acceptable when the actual number of stitches is within the range associated with the first region 70. Conversely, the seam 34 in the first region 70 may not be acceptable when the actual number of stitches is not within the range associated with the first region 70. Similar assessments may be made based on the actual stitch length and the expected stitch length for a particular region. For example, the actual or total stitch length that is provided in a region 70 may be divided by the number of stitches provided to derive the stitch length or average stitch length in the region 70. The stitch length may then be compared to an expected stitch length. If the stitch length is within an expected stitch length tolerance, then the seam in that region 70 may be acceptable, otherwise the stitch length may not be acceptable. Each region 70 may be assessed by comparing at least one stitch attribute associated with that particular region 70 with a tolerance that is associated with the particular region 70. If all of the regions are within tolerance, then the method may continue at block 218. If one or more regions are not within tolerance, then the method may continue at block 220.

At block 218, the trim cover assembly 20 may be accepted since the seam 34 has been properly provided. Acceptance of the trim cover assembly 20 may be communicated to the operator in any suitable manner, such as by providing an audible or visual signal. In at least one embodiment, the controller 88 may prompt the printer 132 to print a barcode 134 that may be provided on or fixed to the trim cover assembly 20 to indicate that the seam 34 is acceptable.

At block 220, the trim cover assembly 20 is rejected since the seam 34 has not been properly provided in at least one region 70. Rejection of the trim cover assembly 20 may be communicated to the operator in any suitable manner, such as by providing an audible or visual signal as previously discussed. In at least one embodiment, the controller 88 may not print a barcode with the printer 132, thereby indicating that the seam 34 has not been properly provided.

The system and method described above may allow stitching of a seam in a trim cover to be more precisely monitored and controlled. Moreover, the system and method may provide higher resolution and monitoring of how a seam is provided in a specific localized region of a trim cover assembly, such as at an airbag deployment seam, to help provide a seam that is not too strong or difficult to sever (e.g., too many stitches) nor too weak. Moreover, the system and method may be flexible and may be easily programmed to accommodate different trim cover assembly models and their associated design parameters.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A method of assembling a trim cover assembly comprising:
   aligning a first trim panel with a second trim panel, wherein at least one of the first trim panel and the second trim panel has a first tab, a second tab, and a third tab that are spaced apart from each other, wherein a first region is at least partially disposed between the first tab and the second tab and a second region is at least partially disposed between the second tab and the third tab;
   feeding the first and second trim panels into a sewing machine to stitch a seam that attaches the first trim panel to the second trim panel;
   measuring a stitch attribute of the seam associated with the first region when the first tab is detected by a detection device that is provided with the sewing machine;
   ending measurement of the stitch attribute associated with the first region and initiating measurement of a stitch attribute of the seam associated with the second region when the second tab is detected by the detection device;
   ending measurement of the stitch attribute associated with the second region when the third tab is detected; and
   determining whether the stitch attributes associated with the first region and the second region are within tolerance.

2. The method of claim 1 further comprising accepting the trim cover assembly when the stitch attribute associated with the first region is within a first predetermined tolerance and the stitch attribute associated with the second region is within a second predetermined tolerance.

3. The method of claim 2 wherein the first predetermined tolerance differs from the second predetermined tolerance.

4. The method of claim 2 further comprising rejecting the trim cover assembly when the stitch attribute associated with the first region is not within the first predetermined tolerance or the stitch attribute associated with the second region is not within the second predetermined tolerance.

5. The method of claim 4 wherein accepting the trim cover assembly includes printing a barcode after completing stitching of the seam and rejecting the trim cover assembly includes not printing the barcode after completing stitching of the seam.

6. The method of claim 1 wherein the stitch attribute associated with the first region is stitch length provided in the first region and the stitch attribute associated with the second region is stitch length provided in the second region.

7. The method of claim 1 wherein the stitch attribute associated with the first region is a number of stitches provided in the first region and the stitch attribute associated with the second region is a number of stitches provided in the second region.

8. The method of claim 1 wherein the first tab is detected by the detection device when the detection device detects an edge of the first tab and the second tab is detected by the detection device when the detection device detects an edge of the second tab.

9. The method of claim 8 wherein the edge of the first tab is a leading edge that is disposed opposite a trailing edge of the first tab, wherein the trailing edge is disposed closer to the second tab than the leading edge.

10. The method of claim 9 wherein the edge of the second tab is a leading edge.

11. The method of claim 8 wherein the edge of the first tab is a trailing edge that is disposed opposite a leading edge of the first tab, wherein the trailing edge is disposed closer to the second tab than the leading edge.

12. The method of claim 11 wherein the edge of the second tab is a trailing edge.

13. A method of assembling a trim cover assembly comprising:
   aligning a first trim panel with a second trim panel, wherein at least one of the first trim panel and the second trim panel has a first notch, a second notch, and a third notch that are spaced apart from each other, wherein a first tab separates the first notch from the second notch and a second tab separates the second notch from the third notch, wherein a first region is at least partially disposed between the first tab and the second tab and a second region is at least partially disposed between the second tab and a third tab;
   feeding the first and second trim panels into a sewing machine to stitch a seam that attaches the first trim panel to the second trim panel;
   measuring a stitch attribute of the seam associated with the first region when the first notch is detected by a detection device that is provided with the sewing machine;
   ending measurement of the stitch attribute associated with the first region and initiating measurement of a stitch attribute of the seam associated with the second region when the second notch is detected by the detection device;
   ending measurement of the stitch attribute associated with the second region when the third notch is detected; and
   determining whether the stitch attributes associated with the first region and the second region are within tolerance.

14. The method of claim 13 wherein the first region extends from the first notch to the second notch.

15. The method of claim 13 wherein the first region extends between a trailing edge of the first tab and a trailing edge of the second tab and the second region extends between the trailing edge of the second tab and a trailing edge of the third tab.

16. A system for assembling a trim cover assembly comprising:
   a sewing machine that includes:
      a needle that stitches a thread into a first trim panel and a second trim panel to form a seam that attaches the first trim panel to the second trim panel;
      a detection device that detects tabs that extend from at least one of the first trim panel and the second trim panel; and
      an electronic controller that controls operation of the sewing machine;
   wherein the electronic controller determines a stitch attribute of a first region of the seam disposed proximate a first tab and a second tab based on detection of the first tab and the second tab by the detection device and determines a stitch attribute of a second region of the seam disposed proximate a second tab and a third tab based on detection of the second tab and the third tab by the detection device.

17. The system of claim 16 wherein the trim cover assembly is accepted when the stitch attributes associated with the first region and the second region are within tolerance and the trim cover assembly is rejected when the stitch attributes associated with at least one of the first region and the second region are not within tolerance.

18. The system of claim 16 wherein the tabs extend away from the seam such that the tabs, but not the seam, are fed through the detection device.

19. The system of claim 16 wherein the seam includes an airbag deployment seam portion that severs to permit deployment of an airbag between the first trim panel and the second trim panel and the airbag deployment seam portion is disposed between the tabs.

20. The system of claim 16 wherein the tabs extend from a curved perimeter edge of the first trim panel and a curved perimeter edge of the second trim panel.

* * * * *